US006701905B1

(12) United States Patent
Gaskins

(10) Patent No.: US 6,701,905 B1
(45) Date of Patent: Mar. 9, 2004

(54) FUEL PRESSURE CONTROL METHOD FOR AN ALTERNATE-FUEL ENGINE

(75) Inventor: Ronald E. Gaskins, Kokomo, IN (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/426,997

(22) Filed: Apr. 30, 2003

(51) Int. Cl.[7] .................................................. F02D 41/14
(52) U.S. Cl. ......................... 123/674; 123/458; 123/497
(58) Field of Search ................................ 123/672, 674, 123/458, 497, 527; 701/109

(56) References Cited

U.S. PATENT DOCUMENTS 4,132,195 A * 1/1979 Bianchi et al. ............. 123/672
4,945,880 A * 8/1990 Gonze et al. ............... 123/674
5,367,999 A * 11/1994 King et al. ................. 123/458
5,507,266 A * 4/1996 Wright et al. ............... 123/497
5,785,025 A * 7/1998 Yoshiume et al. .......... 123/497
6,279,532 B1 * 8/2001 Takano et al. .............. 123/458
6,283,108 B1 * 9/2001 Matsufuji et al. ........... 123/458
6,591,183 B2 * 7/2003 Ishikawa et al. ............ 701/109
6,609,582 B1 8/2003 Botti et al. ................ 180/65.3

* cited by examiner

*Primary Examiner*—Erick Solis
(74) *Attorney, Agent, or Firm*—Jimmy L. Funke; Stefan V. Chmielewski

(57) ABSTRACT

A fuel pressure control for an alternate-fuel engine utilizes adaptively learned corrections for fuel injection pulsewidth to dynamically adjust a base fuel pressure control signal. The resulting fuel pressure control can thus be characterized as open-loop with closed-loop correction based on air/fuel ratio error. The control dynamically adjusts the fuel pressure in a manner to optimize the air/fuel ratio control instead of controlling to a predetermined pressure, and fuel pressure measurement is not required.

4 Claims, 5 Drawing Sheets

FUEL CONTROL — 90
LOOK-UP CURRENT BLM CORRECTION — 92
UPDATE O2 CLOSED LOOP CORRECTION — 94
UPDATE INJECTOR PULSEWIDTH — 96
UPDATE FUEL PRESSURE CONTROL — 98
RETURN

FUEL PRESSURE CONTROL METHOD FOR AN ALTERNATE-FUEL ENGINE

TECHNICAL FIELD

The present invention relates to a fuel control for an internal combustion engine designed to operate with a fuel other than gasoline, and more particularly to a fuel pressure control for such an engine.

BACKGROUND OF THE INVENTION

In general, an alternate-fuel engine is a spark-ignition internal combustion engine designed to operate with a fuel other than gasoline, and encompasses both single fuel engines and so-called dual-fuel engines. Regardless of the type of fuel, the overall objective of the fuel control is to maintain a desired air/fuel ratio for purposes of meeting fuel economy and emission control targets. However, the fuel control strategies vary to some degree depending on the type of fuel being utilized. For example, precise fuel pressure control is much more important with alternate fuels such as compressed natural gas (CNG) or liquid propane (LP) than with gasoline. Accordingly, most alternate-fuel engines utilize closed-loop fuel pressure control, with one or more sensors for precisely measuring the fuel pressure and a pressure adjustment mechanism for maintaining the measured fuel pressure at a fixed or predetermined value. The fuel pressure adjustment mechanism may be either an adjustable fuel pressure regulator or an adjustable speed fuel pump. However, it is difficult to schedule the desired fuel pressure for optimal air/fuel ratio control, and the required fuel pressure sensors significantly increase the fuel system cost. Accordingly, what is needed is an improved fuel pressure control that provides optimal air/fuel ratio control, and that does not require precise fuel pressure measurement.

SUMMARY OF THE INVENTION

The present invention is directed to an improved fuel pressure control for an alternate-fuel engine, wherein adaptively learned corrections for fuel injection pulsewidth based on air/fuel ratio sensing are also utilized to dynamically adjust a base fuel pressure control signal. The fuel pressure control may therefore be characterized as an open-loop control with a closed-loop correction term based on air/fuel ratio error. The control dynamically adjusts the fuel pressure in a manner to optimize the air/fuel ratio control instead of controlling to a predetermined pressure, and fuel pressure measurement is not required.

BRIEF DESCRIPTION OF THE DRAWINGS

FIG. 3 is a main flow diagram for fuel control, FIG. 4 details a portion of the flow diagram of FIG. 3 pertaining to closed-loop adjustment of a block learn fuel control table, FIG. 5 details a portion of the flow diagram of FIG. 3 pertaining to updating a fuel injection pulsewidth, and FIG. 6 details a portion of the flow diagram of FIG. 3 pertaining to updating fuel pressure.

DESCRIPTION OF THE PREFERRED EMBODIMENT

Figure 1:
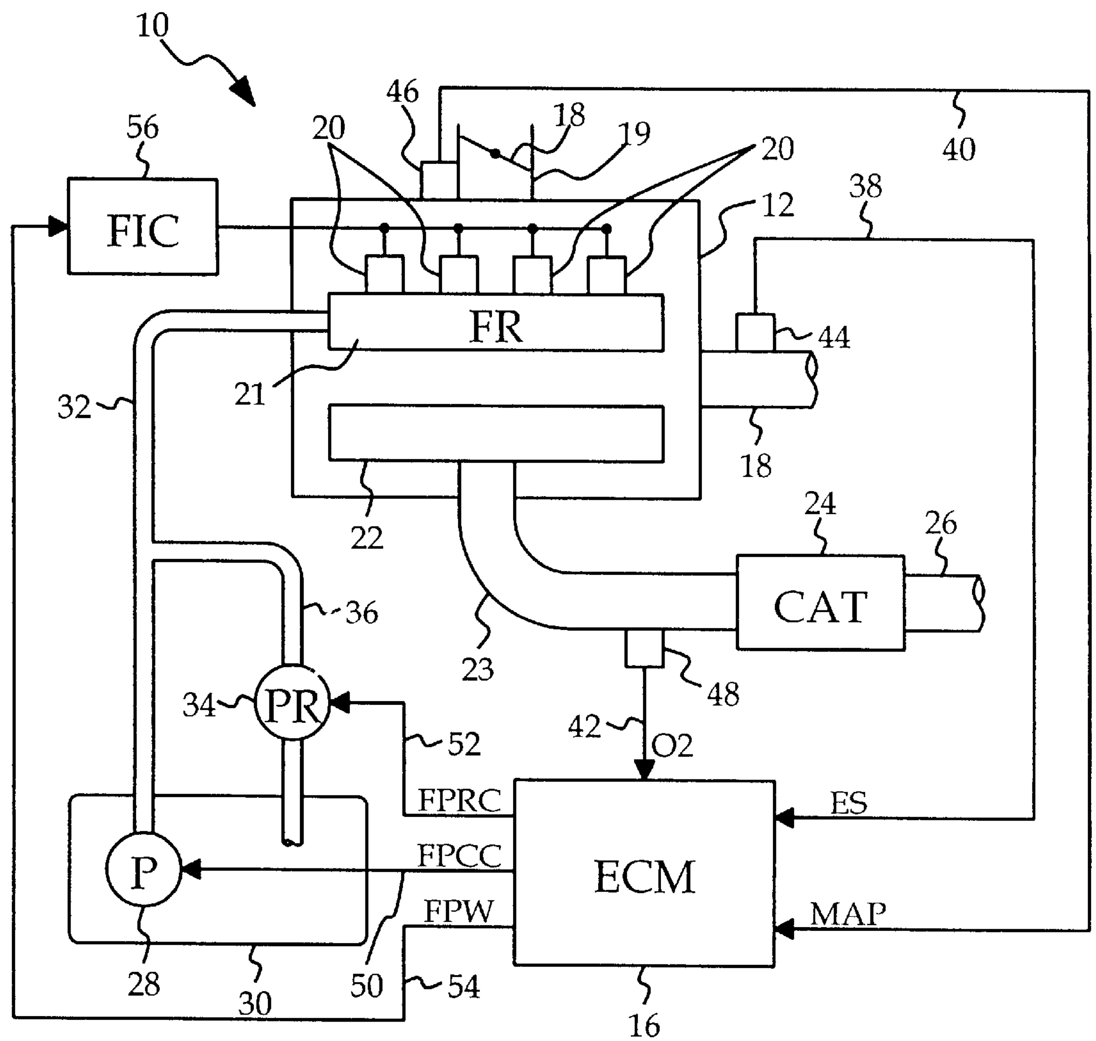
FIG. 1 is a diagram of a motor vehicle engine and fuel control including a microprocessor-based engine control module (ECM) programmed to operate in accordance with this invention.

Referring to FIG. 1, the reference numeral 10 generally designates a motor vehicle powerplant including an alternate-fuel internal combustion engine 12 having an output shaft 14 connected to drive the vehicle, and a microprocessor-based engine control module (ECM) 16 for carrying out the fuel control of this invention. The engine 12 includes an intake air control valve 18 mounted in an intake passage 19, a fuel system including a plurality of fuel injectors 20 coupled to a fuel rail (FR) 21 for combining fuel with the intake air for delivery to the engine cylinders for combustion therein, an exhaust manifold 22 and pipe 23 for receiving exhaust gasses from the cylinders, a three-way catalytic converter (CAT) 24 for minimizing certain exhaust gas emissions, and a tail pipe 26. The fuel system additionally includes a motor driven fuel pump 28 disposed in a fuel tank or reservoir 30 for supplying pressurized fuel to the fuel rail (FR) 21 via pressure line 32, and optionally, a fuel pressure regulator 34 disposed in fuel return line 36 for regulating the fuel pressure in fuel rail 21 by returning a controlled portion of the fuel in pressure line 32 to the fuel tank 30.

The ECM 16 controls both the fuel pressure and the duration of fuel injection based on various environmental and engine operating parameters including the engine speed (ES) on line 38, the manifold absolute air pressure (MAP) on line 40 and a measure of the exhaust gas oxygen (O2) on line 42. The engine speed ES is measured by a conventional speed sensor 44 disposed in proximity to the engine output shaft or flywheel 44, the manifold absolute pressure MAP is measured by a conventional pressure sensor 46 coupled to the engine intake manifold, and the exhaust gas oxygen (O2) is measured by a conventional oxygen sensor 48 of the switching or wide-range type.

The fuel pressure can be controlled by adjusting either the operating speed (capacity) of fuel pump 28 or a control pressure within the optional pressure regulator 34. In fuel pump control applications, the ECM 16 generates a fuel pump capacity command (FPCC) for fuel pump 28 on line 50; in pressure regulator control applications, the ECM 16 generates a fuel pressure regulator command (FPRC) for pressure regulator 34 on line 52, and the fuel pump capacity command FPCC may be a fixed value for operating the pump 28 at a substantially constant speed. In both cases, the control signal may be characterized as pulse-width-modulation (PWM) duty cycle signal.

The duration of fuel injection is specified by a fuel pulsewidth signal (FPW) generated by ECM 16 on line 54. The FPW signal is applied to fuel injection control unit (FIC) 56 which activates the fuel injectors 20 in synchronism with engine rotation in a conventional manner.

Figure 2:
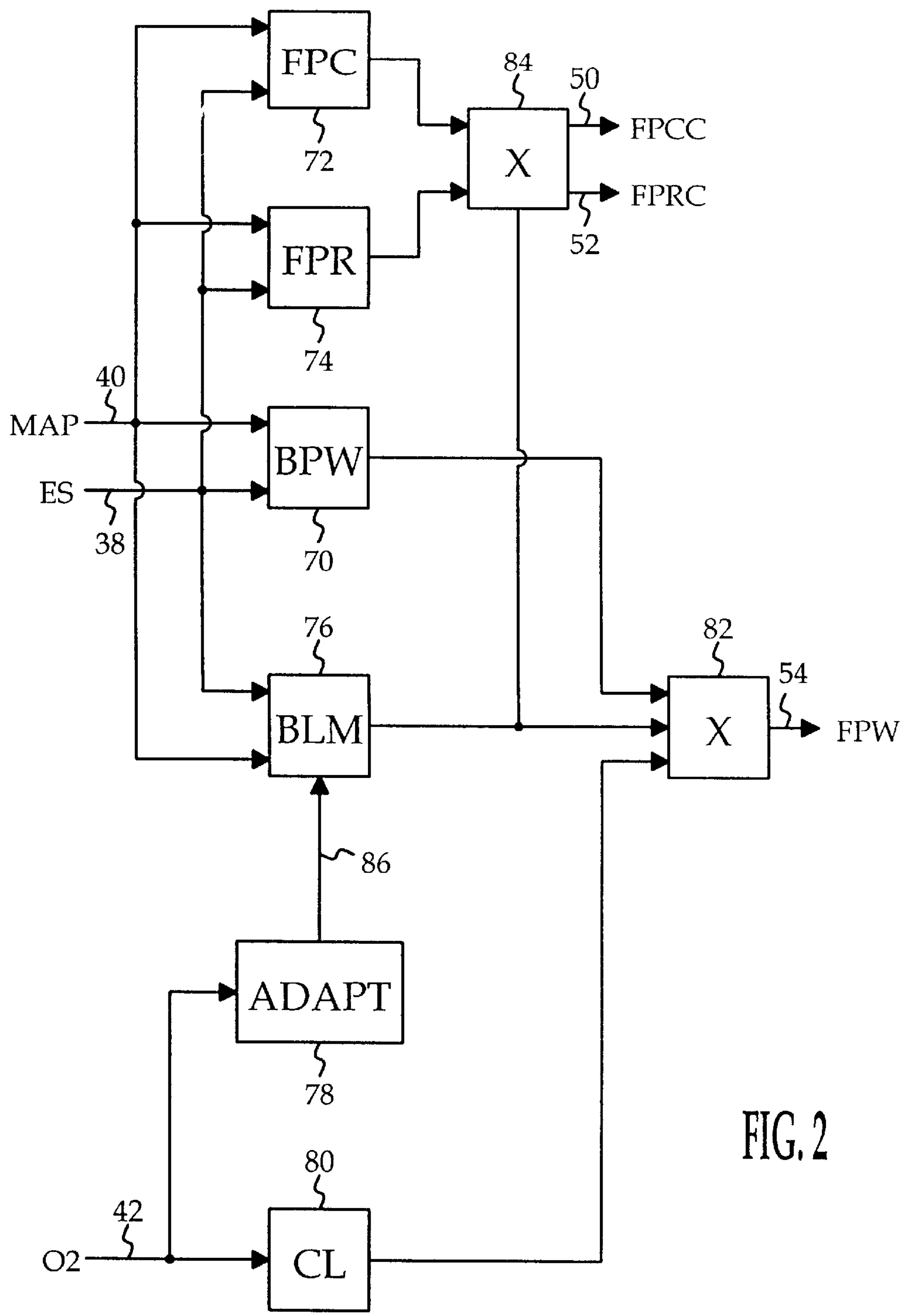
FIG. 2 is a block diagram depicting a control carried out by the ECM of FIG. 1 according to this invention.

Referring to the block diagram of FIG. 2, the fuel control method carried out by ECM 16 is represented by the blocks 70, 72, 74, 76, 78, 80, 82 and 84. The block 70 represents a calibrated look-up table of fuel injector base pulsewidth (BPW) as a function of ES and MAP. The same two input parameters (ES and MAP) are applied to three other look-up tables represented by the blocks 72, 74 and 76. In applications where the fuel pump 28 is used to control fuel pressure, the block 72 represents a calibrated table of PWM values for controlling the pump speed based on ES and MAP. In applications where the fuel pressure regulator 34 is used to control fuel pressure, the block 74 represents a calibrated table of PWM values for controlling a regulator bias pressure based on ES and MAP. The block 76, customarily referred to as a block learning memory or BLM, represents a table of adaptive fuel corrections for various combinations of ES and MAP. The adaptive logic block (ADAPT) 78 determines the adaptive fuel corrections during engine operation based on the deviation of the actual air/fuel ratio (as determined from the O2 signal on line 42) from the desired value, and supplies the corrections to block 76 via line 86. Thus, the block 76 is implemented with an electrically alterable non-volatile memory device such as an EEPROM or a Flash Memory. The adaptive fuel corrections are configured as multipliers, and are applied along with a closed-loop term to the base fuel pulsewidth BPW in conventional fuel control applications. Thus, FIG. 2 includes a closed-loop (CL) block 80 for developing a closed-loop correction (using a PID or similar formulation), and a multiplier 82 for applying the closed-loop term of block 80 and the adaptive fuel correction of block 76 to the base pulsewidth BPW to form the fuel pulsewidth FPW.

According to the present invention, the adaptive fuel pressure corrections stored in the BLM 76 are additionally used to adjust the fuel pressure control signal FPCC or FPRC. In applications where the fuel pump 28 is used to control fuel pressure, the multiplier 84 combines the calibrated fuel pump control signal from block 72 with the adaptive fuel pressure correction from BLM 76 to form the fuel pump capacity command FPCC on line 50. In applications where the fuel pressure regulator 34 is used to control fuel pressure, the multiplier 84 combines the calibrated fuel pressure regulator control signal from block 74 with the adaptive fuel pressure correction from BLM 76 to form the fuel pressure regulator command FPRC on line 52. Applying the adaptive fuel pressure corrections from BLM 76 to the calibrated fuel pressure control signal serves to dynamically adjust the fuel pressure in a manner to optimize the air/fuel ratio control, and coordinates the fuel pressure control with the fuel injection duration control.

Figure 3:
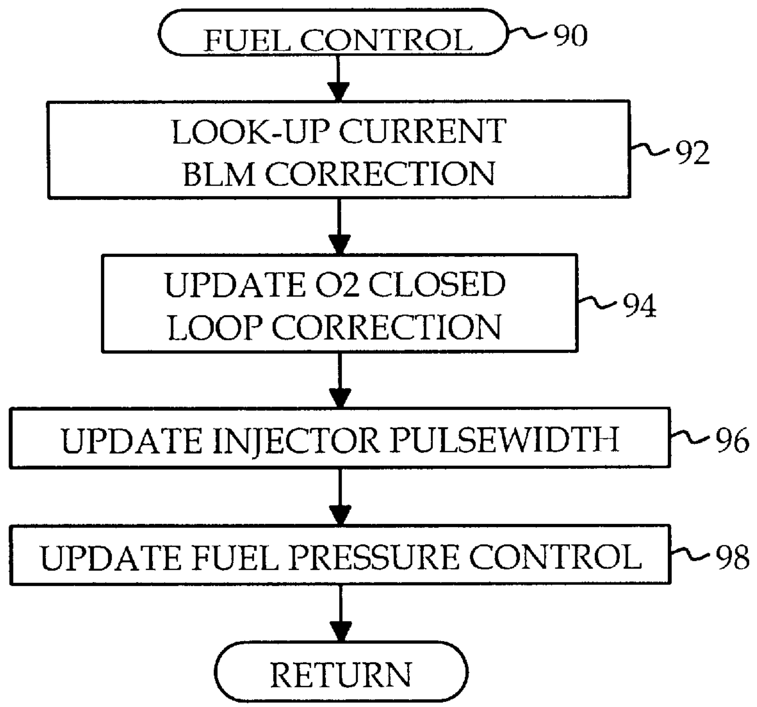
FIGS. 3–6 are flow diagrams representing a software routine executed by the ECM of FIG. 1 according to this invention.

The flow diagrams of FIGS. 3–6 represent a software routine executed by ECM 16 for carrying out the above described control. FIG. 3 is a main flow diagram for the fuel control, and includes the blocks 92, 94, 96 and 98 which are successively executed as shown. At block 92, the ECM 16 retrieves the current BLM correction based on ES and MAP. At block 94 the closed-loop terms are updated, as detailed by the flow diagram of FIG. 4. At block 96 the injector pulsewidth control is updated, as detailed by the flow diagram of FIG. 5. And at block 98 the fuel pressure control is updated, as detailed by the flow diagram of FIG. 6.

Figure 4:
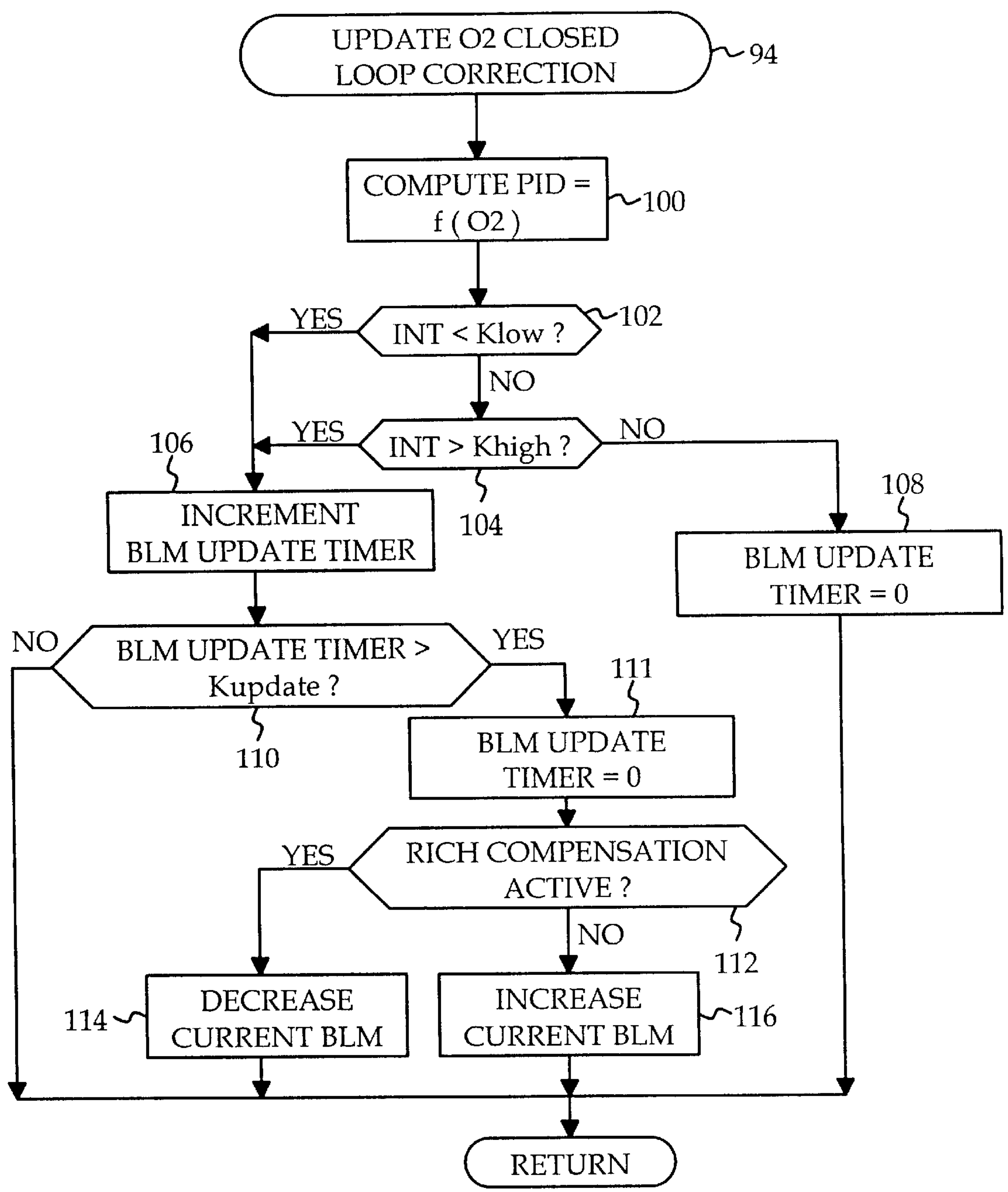

Referring to FIG. 4, the block 100 is first executed to compute a proportional-integral-differential (PID) closed-loop term based on the deviation of the detected air/fuel ratio from the desired value. The blocks 102 and 104 then compare the integral term INT of the PID computation to calibrated thresholds Klow and Khigh. If INT is less than Klow or greater than Khigh, the block 106 is executed to increment the BLM Update Timer; otherwise, the block 108 resets the BLM Update Timer to zero. Once the BLM Update Timer exceeds an update threshold Kupdate, the block 110 is answered in the affirmative, and the blocks 111, 112, 114 and 116 are executed to reset the BLM Update Timer to zero and to update the current BLM cell. If the air/fuel ratio is too rich, as determined at block 112, the block 114 decreases the current BLM cell to reduce the amount of injected fuel; otherwise, the air/fuel ratio is too lean, and the block 116 increases the current BLM cell to increase the amount of injected fuel.

Figure 5:
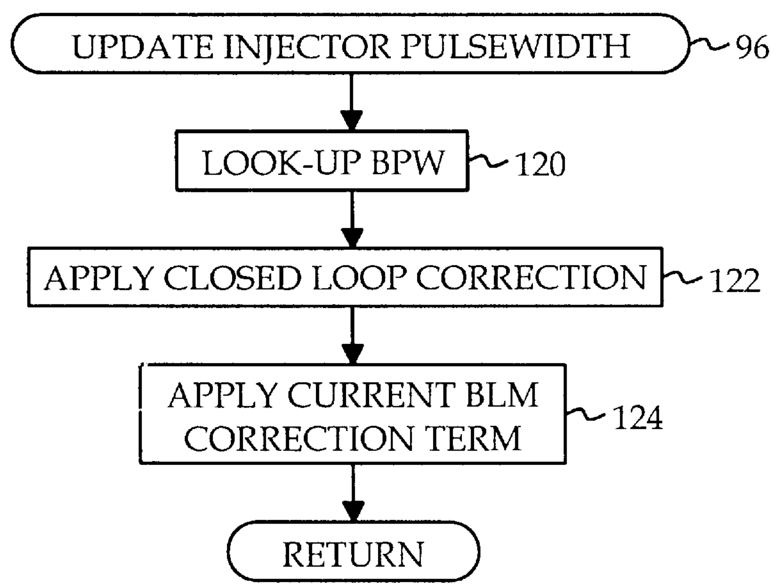

Referring to FIG. 5, the blocks 120, 122 and 124 are executed in sequence as shown to update the fuel injection pulsewidth. The block 120 determines the base pulsewidth BPW by table look-up as described in reference to block 70 of FIG. 2. The blocks 122 and 124 then respectively apply the closed-loop and BLM correction values to BPW to form the fuel pulsewidth FPW.

Figure 6:
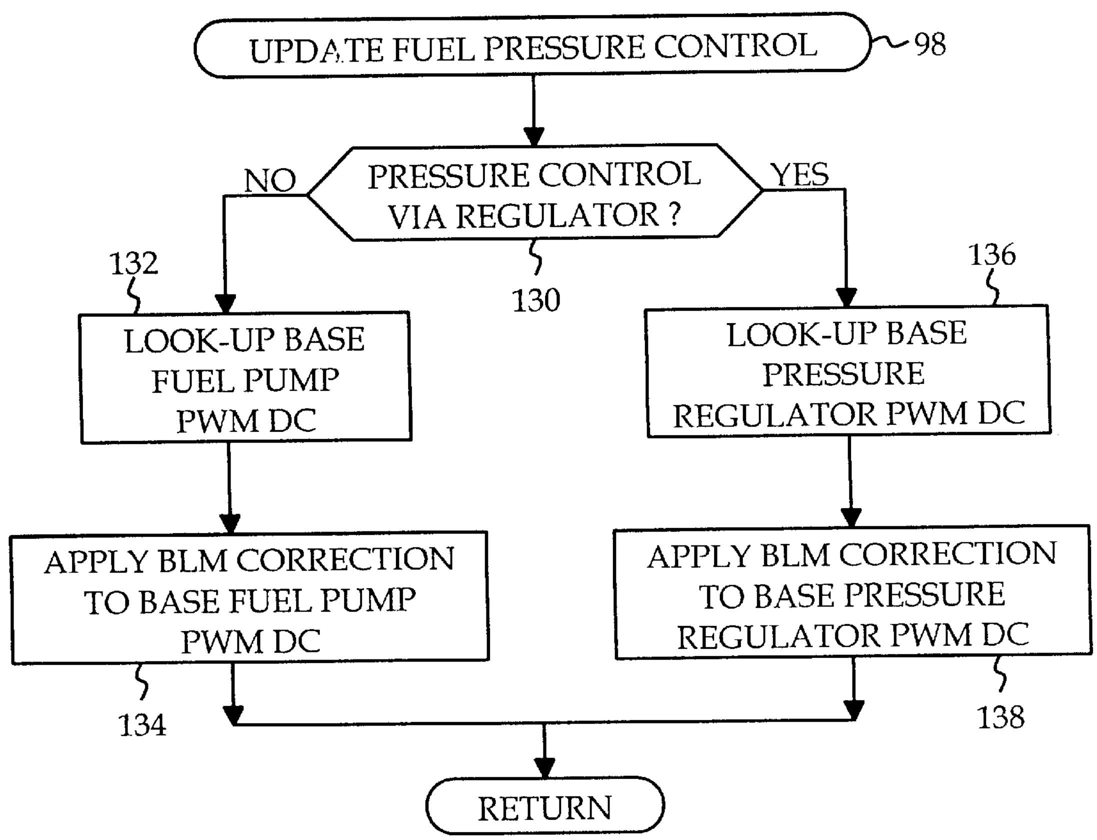

Referring to FIG. 6, the block 130 is initially executed to determine if the fuel pressure is being controlled by means of an adjustable pressure regulator such as the regulator 34 of FIG. 1. If not, the blocks 132 and 134 are executed to determine a base PWM duty cycle for the motor-driven fuel pump 28, and to apply the adaptive BLM fuel correction to the base value to form the fuel pump capacity command FPCC. If block 130 is answered in the affirmative, the blocks 136 and 138 are executed to determine a base PWM duty cycle for the pressure regulator 34, and to apply the adaptive BLM fuel correction to the base value to form the fuel pressure regulator command FPRC.

In summary, the present invention provides an effective and low-cost fuel control method for an alternate-fuel internal combustion engine. The air/fuel ratio control performance is improved compared to systems that attempt to maintain the fuel pressure at a constant or predetermined value, and the expense associated with accurately measuring the fuel pressure is eliminated. While the control of this invention has been described in reference to the illustrated embodiment, it is anticipated that various modifications in addition to those mentioned above will occur to those skilled in the art. For example, the ECM 16 could be programmed in the case of a dual fuel engine to utilize the disclosed fuel pressure control only when operation with an alternate fuel is detected. In this regard, it should be understood that control methods incorporating these and other modifications may fall within the scope of this invention, which is defined by the appended claims.

What is claimed is:

1. A method of controlling a fuel pressure control mechanism in an alternate-fuel internal combustion engine where fuel is delivered to the engine for a duration that is scheduled to achieve a desired air/fuel ratio, the method comprising the steps of:

retrieving a calibrated base fuel pressure control value based on measured engine operating conditions;

dynamically adjusting said base fuel pressure control value based on a deviation of an actual air/fuel ratio from said desired air/fuel ratio to form a fuel pressure command; and controlling said fuel pressure control mechanism in accordance with said fuel pressure command.

2. The method of claim 1, including the steps of:

forming and updating a table of adaptive fuel delivery corrections for different engine operating conditions based on an integral of said deviation;

retrieving an adaptive fuel delivery correction from said table based on said measured engine operating conditions; and adjusting said base fuel pressure control value in accordance with said retrieved adaptive fuel delivery correction to form said fuel pressure command.

3. The method of claim 1, wherein said fuel pressure control mechanism is a fuel pump, and said fuel pressure command controls a speed of said fuel pump.

4. The method of claim 1, wherein said fuel pressure control mechanism is a fuel pressure regulator, and said fuel pressure command controls a regulating pressure of said fuel pressure regulator.

* * * * *